(12) United States Patent
Kim (10) Patent No.: US 11,125,404 B2
(45) Date of Patent: Sep. 21, 2021

(54) LED LIGHTING MODULE FOR LOW STREETLIGHT AND LED LENS

(71) Applicants: UNO ENP CO., LTD., Seoul (KR); SUNRIN CO., LTD., Anseong-si (KR)

(72) Inventor: Soongyu Kim, Gwangju (KR)

(73) Assignees: UNO ENP CO., LTD., Seoul (KR); SUNRIN CO., LTD., Anseong-si (KR)

( * ) Notice: Subject to any disclaimer, the term of this patent is extended or adjusted under 35 U.S.C. 154(b) by 0 days.

(21) Appl. No.: 16/632,379

(22) PCT Filed: Jul. 19, 2018

(86) PCT No.: PCT/KR2018/008193
§ 371 (c)(1),
(2) Date: Jan. 20, 2020

(87) PCT Pub. No.: WO2019/017719
PCT Pub. Date: Jan. 24, 2019

(65) Prior Publication Data
US 2020/0232617 A1     Jul. 23, 2020

(30) Foreign Application Priority Data
Jul. 21, 2017  (KR) .................. 10-2017-0093022

(51) Int. Cl.
*F21S 8/08*    (2006.01)
*F21V 5/04*    (2006.01)
(Continued)

(52) U.S. Cl.
CPC .............. *F21S 8/086* (2013.01); *F21V 5/04* (2013.01); *F21V 7/0083* (2013.01); *F21W 2131/103* (2013.01); *F21Y 2115/10* (2016.08)

(58) Field of Classification Search
CPC .............. F21S 8/086; F21V 5/04; F21V 5/08
See application file for complete search history.

(56) References Cited

U.S. PATENT DOCUMENTS 6,402,337 B1 *  6/2002  LeVasseur .............. F21S 8/083
                                                          362/153.1
7,976,199 B2 *  7/2011  Berns ..................... F21S 8/083
                                                          362/298
(Continued)

FOREIGN PATENT DOCUMENTS

JP      2013-037920 A    2/2013
KR      10-0936430 B1    1/2010
(Continued)

OTHER PUBLICATIONS

International Search Report in International Application No. PCT/KR2018/008193, dated Oct. 1, 2018, 2 pages.

*Primary Examiner* — Jong-Suk (James) Lee
*Assistant Examiner* — Eric T Eide
(74) *Attorney, Agent, or Firm* — Park, Kim & Suh, LLC (57) ABSTRACT

The present invention relates to an LED lighting module for a low street light, installed at a low height on the periphery of a road or a median strip, to illuminate light in a direction crossing the road, and to an LED lens provided on the LED lighting module. When using the LED lighting module for the low streetlight and the LED lens, according to one embodiment of the present invention, streetlight can be installed at a low height thereby reducing the cost for streetlight installation, glare on a car driver can be prevented by evenly lighting the road in the horizontal direction while deflecting downward, and the loss of light can be minimized.

5 Claims, 8 Drawing Sheets

(51) Int. Cl.
*F21V 7/00* (2006.01)
*F21Y 115/10* (2016.01)
*F21W 131/103* (2006.01)

(56) References Cited

U.S. PATENT DOCUMENTS

| | | | |
|---|---|---|---|
| 9,291,334 B2* | 3/2016 | Grassi | F21S 8/032 |
| 10,274,159 B2* | 4/2019 | Kim | F21V 7/0091 |
| 2010/0296267 A1* | 11/2010 | Yu | F21S 8/086 |
| | | | 362/85 |
| 2011/0074313 A1* | 3/2011 | Gordin | F21V 23/0435 |
| | | | 315/294 |
| 2013/0026928 A1* | 1/2013 | Bizzotto | F21V 23/0442 |
| | | | 315/151 |
| 2014/0085919 A1* | 3/2014 | Tsai | F21S 41/322 |
| | | | 362/522 |

FOREIGN PATENT DOCUMENTS

| | | |
|---|---|---|
| KR | 10-2010-0123194 A | 11/2010 |
| KR | 10-2011-0052458 A | 5/2011 |
| KR | 10-2014-0065323 A | 5/2014 |

* cited by examiner

LED LIGHTING MODULE FOR LOW STREETLIGHT AND LED LENS

CROSS-REFERENCE TO RELATED APPLICATIONS

This application is the National Stage filing under 35 U.S.C. 371 of International Application No. PCT/KR2018/008193, filed on Jul. 19, 2018, which claims the benefit of Korean Patent Application No. 10-2017-0093022, filed on Jul. 21, 2017, the contents of which are all hereby incorporated by reference herein in their entirety.

TECHNICAL FIELD

The present disclosure relates to a light emitting diode (LED) lighting module for a low streetlight and an LED lens, and more particularly, to an LED lighting module for a low streetlight installed with a low height at an edge or median strip of a road.

BACKGROUND ART

In general, a streetlight is a lighting facility installed along a street for the safety and security of the traffic of the street, is installed in an expressway, a main road of a city, a road of a commercial district, a road of a residential area, or the like, and is provided in an appropriate form depending on a space for installing the streetlight.

A conventional streetlight includes a pillar put with a great height on the ground of a roadside, an arm connected to the pillar toward a road, and a light source electrically connected to the arm. That is, the conventional streetlight is installed at a high position by the pillar and the arm to emit light in a downward direction toward the road.

Accordingly, the conventional streetlight is configured in such a way that a structure such as a pillar or an arm is installed to emit light downward from a high position, and thus there is a problem in terms of increasing installation costs.

A mercury lamp, a halogen lamp, a metal halide lamp, or a sodium lamp has been used as a light source of a streetlight, but recently, research has been actively conducted into streetlights using a light emitting diode (LED).

DISCLOSURE

Technical Problem

It is an object of the present disclosure to provide a light emitting diode (LED) lighting module for a low streetlight and an LED lens included in the LED lighting module, installed at a low height at a roadside or a median strip and configured to emit light in a lateral direction across the road.

Technical Solution

According to an embodiment of the present disclosure, a light emitting diode (LED) lighting module for a low streetlight for emitting light in a direction across a road includes, when a lateral direction across the road is an x-axis direction, a longitudinal direction of the road is a y-axis direction, and a height direction is a z-axis direction, a substrate, a plurality of LEDs arranged in the y-axis direction on the substrate and installed to have an optical axis in the x-axis direction, and an LED lens configured to have a central axis in the x-axis direction on the LED and including an accommodation groove configured to accommodate the LED, and a light emitting surface configured to emit light that is emitted from the LED accommodated in the accommodation groove and is incident into the LED lens, wherein the central axis of the LED lens is configured to be deflected by a predetermined distance in a downward direction compared with an optical axis to deflect and emit light emitted from the LED accommodated in the accommodation groove in a downward direction, and the front surface of the accommodation groove has a convex shape toward the LED accommodated in the accommodation groove based on an x-z sectional view.

In the LED lighting module for a low streetlight according to an embodiment of the present disclosure, the light emitting surface may include an upward light emitting surface, an intermediate light emitting surface, and a downward light emitting surface based on an x-z sectional view, and the upward light emitting surface has (+) curvature, the intermediate light emitting surface has (0) curvature, and the downward light emitting surface has (−) curvature.

In the LED lighting module for a low streetlight according to an embodiment of the present disclosure, the accommodation groove may be formed at a central portion of a bottom surface of the LED lens, and the LED lens may have a pair of first reflective surfaces that are symmetrical with each other at opposite sides in the z-axis direction based on the accommodation groove to configure lateral surfaces in the z-axis direction of the LED lens and reflects light emitted in the z-axis direction of light emitted from the LED accommodated in the accommodation groove toward the light emitting surface.

In the LED lighting module for a low streetlight according to an embodiment of the present disclosure, the LED lens may include a pair of inclined grooves that are formed to be symmetrical with each other at opposite sides in the y-axis direction of the bottom surface based on the accommodation groove, and the pair of inclined grooves may form a pair of second reflective surfaces that reflect light emitted in the y-axis direction of light emitted from the LED accommodated in the accommodation groove toward the light emitting surface and prevents light from interfering with another LED lens adjacent to the LED lens.

In the LED lighting module for a low streetlight according to an embodiment of the present disclosure, the accommodation groove may accommodate at least one white LED for emitting white light and at least one yellow LED for emitting yellow light, and the white LED and the yellow LED may be alternately arranged in the y-axis direction.

In the LED lighting module for a low streetlight according to an embodiment of the present disclosure, the optical axis of the LED and the central axis of the LED lens may be inclined at a predetermined angle in a downward direction.

According to an embodiment of the present disclosure, a light emitting diode (LED) lighting module for a low streetlight for emitting light in a direction across a road includes, when a lateral direction across the road is an x-axis direction, a longitudinal direction of the road is a y-axis direction, and a height direction is a z-axis direction, a substrate, a plurality of LEDs arranged in the y-axis direction on the substrate and installed to have an optical axis in the x-axis direction, and an LED lens configured to have a central axis in the x-axis direction on the LED and configured to emit light emitted from the LED to be deflected in a downward direction, wherein the LED lens includes an accommodation groove formed at a central portion of a bottom surface of the LED lens and configured to accommodate the LED, a light emitting surface configured to emit light that is emitted from the LED accommodated in the accommodation groove and is incident into the LED lens, and a pair of first reflective surfaces that are symmetrical with each other at opposite sides in the z-axis direction based on the accommodation groove to configure lateral surfaces in the z-axis direction of the LED lens and reflects light emitted in the z-axis direction of light emitted from the LED accommodated in the accommodation groove toward the light emitting surface, wherein the light emitting surface includes an upward light emitting surface, an intermediate light emitting surface, and a downward light emitting surface based on an x-z sectional view, and the upward light emitting surface has (+) curvature, the intermediate light emitting surface has (0) curvature, and the downward light emitting surface has (−) curvature.

According to an embodiment of the present disclosure, a light emitting diode (LED) lens included in a LED lighting module for a low streetlight includes, when a central-axis direction of the LED lens is an x-axis direction, a horizontal direction of the LED lens is a y-axis direction, and a vertical direction of the LED lens is a z-axis direction, a bottom surface, an accommodation groove formed at a central portion of the bottom surface and configured to accommodate an LED, a light emitting surface configured to emit light that is emitted from the LED accommodated in the accommodation groove and is incident into the LED lens, and a pair of first reflective surfaces that are symmetrical with each other at opposite sides in the z-axis direction based on the accommodation groove to configure lateral surfaces in the z-axis direction of the LED lens and reflects light emitted in the z-axis direction of light emitted from the LED accommodated in the accommodation groove toward the light emitting surface, wherein the accommodation groove is convex toward an opposite direction to the LED accommodated in the accommodation groove based on an x-y sectional view, and a front surface of the accommodation groove is convex toward the LED accommodated in the accommodation groove based on the x-z sectional view.

In the LED lighting module for a low streetlight according to an embodiment of the present disclosure, the light emitting surface may be convex toward an opposite direction to the LED accommodated in the accommodation groove based on the x-y sectional view and may include an upward light emitting surface, an intermediate light emitting surface, and a downward light emitting surface based on the x-z sectional view, and the upward light emitting surface may have (+) curvature, the intermediate light emitting surface may have (0) curvature, and the downward light emitting surface may have (−) curvature.

In the LED lighting module for a low streetlight according to an embodiment of the present disclosure, the LED lens may include a pair of inclined grooves that are formed to be symmetrical with each other at opposite sides in the y-axis direction of the bottom surface based on the accommodation groove, and the pair of inclined grooves may form a pair of second reflective surfaces that reflect light emitted in the y-axis direction of light emitted from the LED accommodated in the accommodation groove toward the light emitting surface.

According to another embodiment of the present disclosure, a light emitting diode (LED) lens included in a LED lighting module for a low streetlight includes, when a central-axis direction of the LED lens is an x-axis direction, a horizontal direction of the LED lens is a y-axis direction, and a vertical direction of the LED lens is a z-axis direction, a bottom surface, an accommodation groove formed at a central portion of the bottom surface and configured to accommodate an LED, a light emitting surface configured to emit light that is emitted from the LED accommodated in the accommodation groove and is incident into the LED lens, and a pair of first reflective surfaces that are symmetrical with each other at opposite sides in the z-axis direction based on the accommodation groove to configure lateral surfaces in the z-axis direction of the LED lens and reflects light emitted in the z-axis direction of light emitted from the LED accommodated in the accommodation groove toward the light emitting surface, wherein the light emitting surface is convex toward an opposite direction to the LED accommodated in the accommodation groove based on the x-y sectional view and includes an upward light emitting surface, an intermediate light emitting surface, and a downward light emitting surface based on the x-z sectional view, and the upward light emitting surface has (+) curvature, the intermediate light emitting surface has (0) curvature, and the downward light emitting surface has (−) curvature.

Advantageous Effects

When a light emitting diode (LED) lighting module for a low streetlight and an LED lens included in the LED lighting module according to an embodiment of the present disclosure as configured above are used, the streetlight may be installed at a low position of a roadside or a median strip, thereby reducing an installation cost of the streetlight.

When an LED lighting module for a low streetlight and an LED lens according to an embodiment of the present disclosure are used, the streetlight may be installed at a low position of a roadside or a median strip and may emit light in a lateral direction across the road to be deflected in a downward direction, thereby preventing vehicle driver's glare and simultaneously minimizing light loss by preventing light from being emitted upward.

In addition, when an LED lighting module for a low streetlight and an LED lens according to an embodiment of the present disclosure are used, light may be uniformly emitted to a lateral direction across a road.

It will be appreciated by persons skilled in the art that that the effects that could be achieved with the present disclosure are not limited to what has been particularly described hereinabove and other advantages of the present disclosure will be more clearly understood from the detailed description.

BEST MODE

Exemplary embodiments of the present disclosure are described in detail so as for those of ordinary skill in the art to easily implement the present disclosure with reference to the accompanying drawings.

Exemplary embodiments of the present disclosure can be variously changed and embodied in various forms, in which illustrative embodiments of the present disclosure are shown. However, exemplary embodiments of the present disclosure should not be construed as being limited to the embodiments set forth herein and any changes, equivalents or alternatives which are within the spirit and scope of the present disclosure should be understood as falling within the scope of the present disclosure.

In the accompanying drawings, the thickness and size of components are exaggerated for clarify of explanation, and thus, the present disclosure is not limited by the relative thickness or size illustrated in the accompanying drawings.

Figure 1:
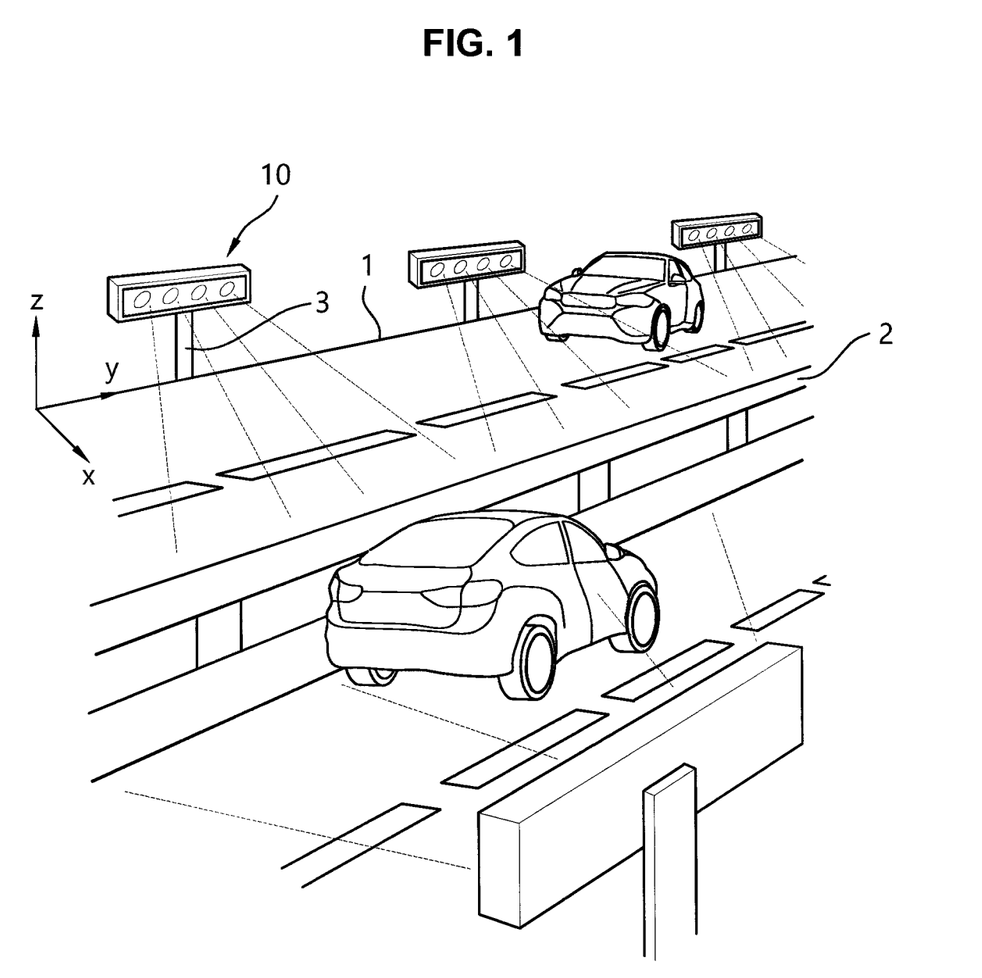
FIG. 1 is a schematic diagram illustrating an installation state of a light emitting diode (LED) lighting module for a low streetlight according to an embodiment of the present disclosure.

FIG. 1 is a schematic diagram illustrating an installation state of a light emitting diode (LED) lighting module for a low streetlight according to an embodiment of the present disclosure.

Referring to FIG. 1, an LED lighting module 10 for a low streetlight according to an embodiment of the present disclosure may be installed with a low height at a roadside 1 and may emit light in a lateral direction across a road.

Hereinafter, for convenience of description, a lateral direction across a road is referred to as the x-axis direction, a longitudinal direction in which a vehicle travels is referred to as the y-axis direction, and a height direction is referred to as the z-axis direction.

Unlike a conventional streetlight that is installed at a high position and emits light in a downward direction toward a road, the LED lighting module 10 may be installed at a low height corresponding to an approximate height of a vehicle and may emit light in the lateral direction (the x-axis direction) of the road.

For example, the LED lighting module 10 may be installed on a guard rail installed at the roadside 1 around the road, may be installed on a median strip 2, or may be installed on the roadside 1 by a separate support 3 with a low height.

Figure 2:
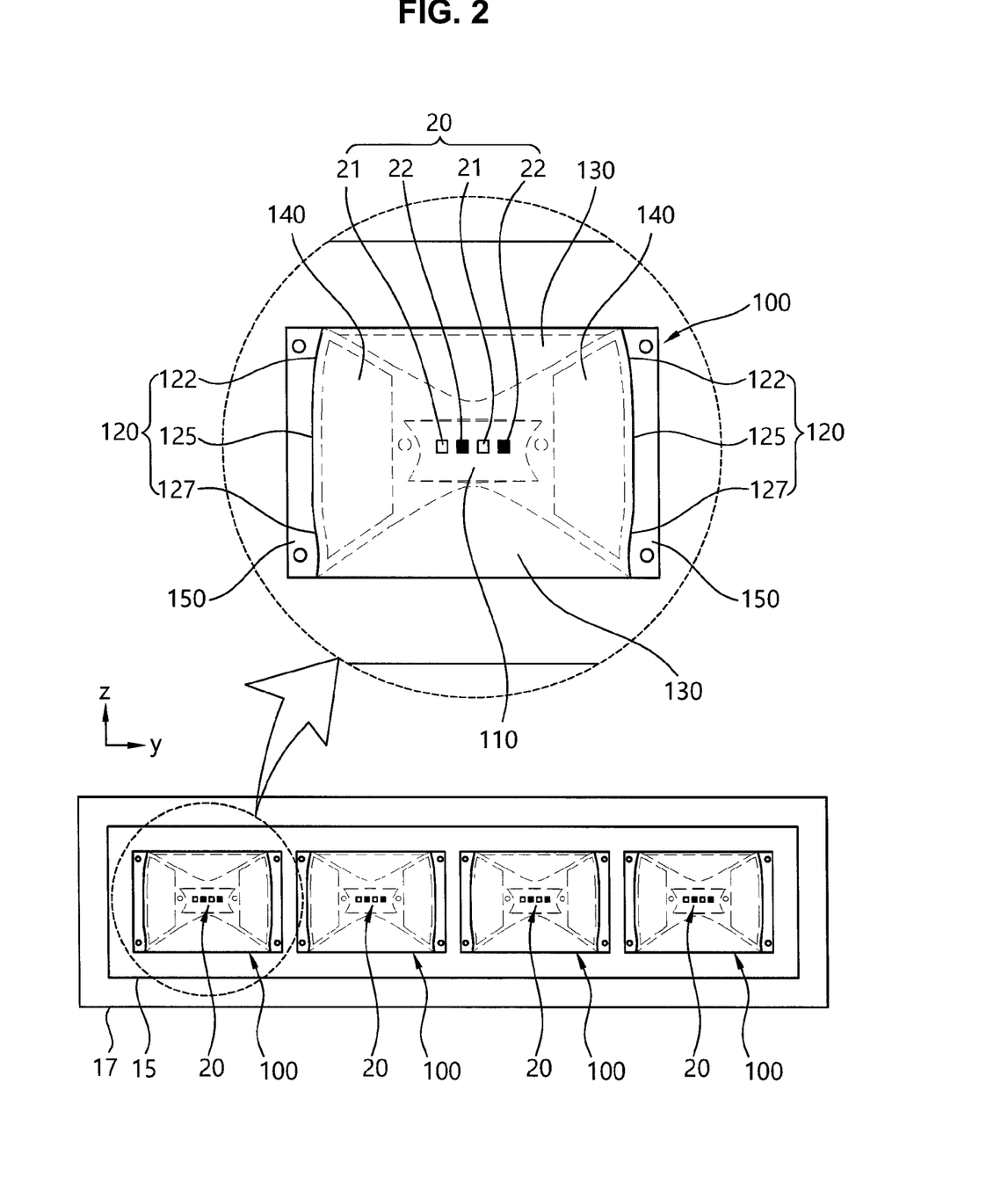
FIG. 2 is a schematic y-z plan view of an LED lighting module for a low streetlight according to an embodiment of the present disclosure.
Figure 3:
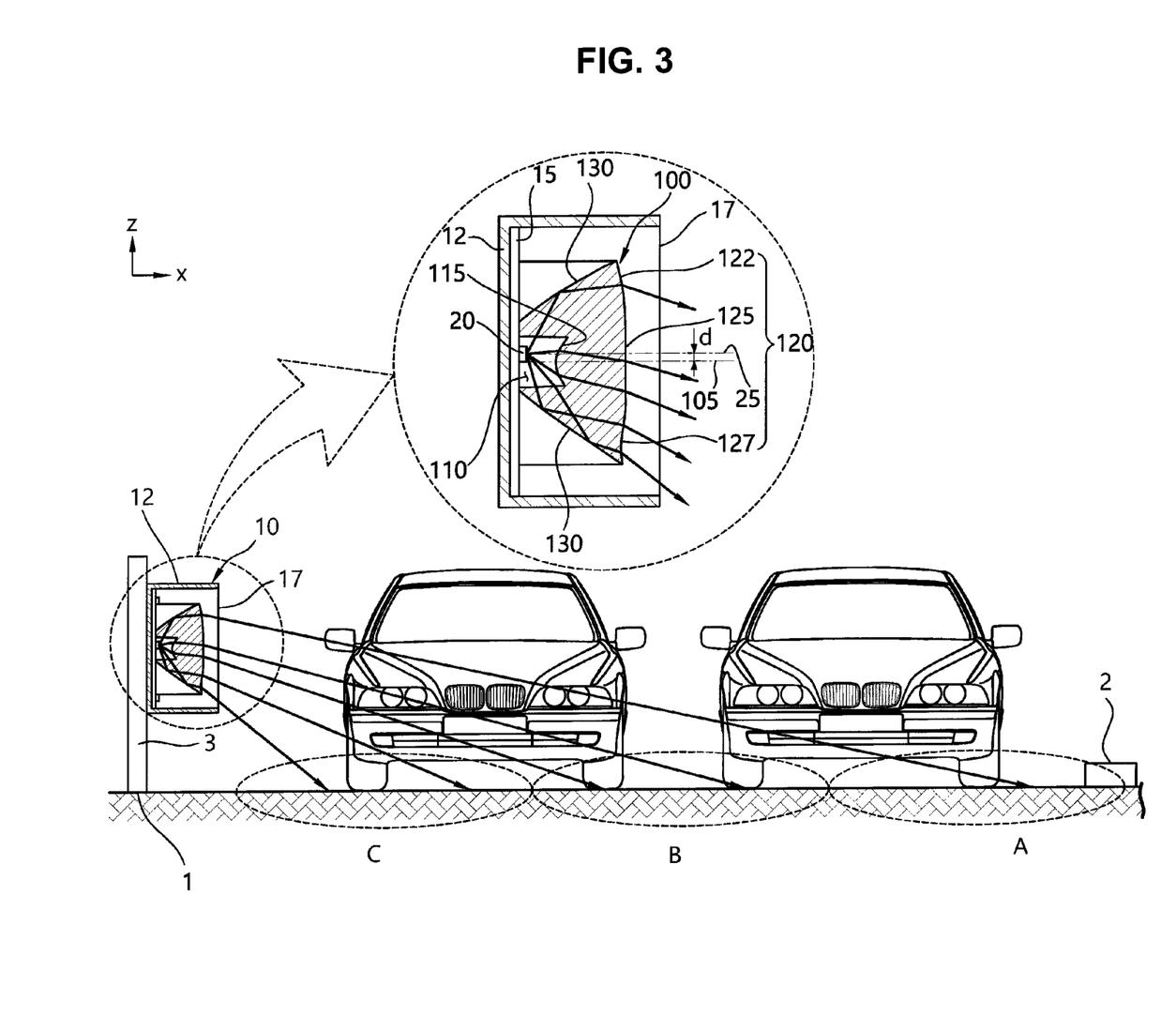
FIG. 3 is a schematic cross sectional view taken along the x-z plan illustrating a state in which an LED lighting module for a low streetlight emits light in a lateral direction of a road according to an embodiment of the present disclosure.

FIG. 2 is a schematic y-z plan view of an LED lighting module for a low streetlight according to an embodiment of the present disclosure. FIG. 3 is a schematic cross sectional view taken along the x-z plan illustrating a state in which an LED lighting module for a low streetlight emits light in a lateral direction of a road according to an embodiment of the present disclosure.

Referring to FIGS. 2 and 3, the LED lighting module 10 for a low streetlight according to an embodiment of the present disclosure may include a frame 12, a substrate 15 included in the frame 12, a plurality of LEDs 20 arranged on the substrate 15, an LED lens 100 disposed on the LEDs 20, and a transparent 17.

The plurality of LEDs 20 may be arranged in a line in the y-axis direction, and each of the plurality of LEDs 20 may be installed on the substrate 15 to have respective optical axes 25 in the approximate x-axis direction.

Thus, the plurality of LEDs 20 may emit light in the x-axis direction while being arranged in a line in the y-axis direction, and an LED array axis 27 for connecting the respective optical axes 25 of the plurality of LEDs 20 may be approximately in parallel to the y-axis.

The LED lens 100 may be configured to have a central axis 105 in the x-axis direction on the LEDs 20 and may be provided in a plural number and arranged in a line in the y-axis direction like the LEDs 20, and a lens array axis 107 for connecting the respective central axes 105 of the plurality of LED lenses 100 may be approximately in parallel to the y-axis.

The LED lens 100 may include an accommodation groove 110 for accommodating the LEDs 20 therein, and a light emitting surface 120 for emitting light that is emitted from the LEDs 20 accommodated in the accommodation groove 110 and is incident into the LED lens 100.

The LED lens 100 according to an embodiment of the present disclosure may be configured to emit light, which is emitted in the approximate x-axis direction by the LEDs 20, to be deflected in a downward direction, and may be configured to uniformly emit light in the x-axis direction.

In detail, the central axis 105 of the LED lens 100 may be configured to be deflected by a predetermined distance 'd' in a downward direction compared with the optical axis 25, and thus the lens array axis 107 may also be deflected by the predetermined distance 'd' in the downward direction compared with the LED array axis 27.

As shown in FIG. 3, a front surface 115 of the accommodation groove 110 may have a convex shape toward the LED 20 accommodated in the accommodation groove 110.

As such, the LED lens 100 may be configured in such a way that the central axis 105 is deflected by the predetermined distance 'd' in the downward direction compared with the optical axis 25 of the LED 20, and when the front surface 115 of the accommodation groove 110 has a convex shape toward the LED 20, light that is emitted in the approximate x-axis direction from the LED 20 accommodated in the accommodation groove 110 may be focused while being deflected in a downward direction and may be incident into the LED lenses 100, and thus light emitted out of the LED lenses 100 through the light emitting surface 120 of the LED lenses 100 may emit light in the x-axis direction while being focused to be deflected in the downward direction.

The light emitting surface 120 may include an upward light emitting surface 122 having (+) curvature, an intermediate light emitting surface 125 having (0) curvature, and a downward light emitting surface 127 having (−) curvature.

Then, light emitted toward the light emitting surface 120 of the LED lens 100 may be emitted in the x-axis direction while being deflected in a downward direction, and simultaneously, may be uniformly emitted in the x-axis direction.

That is, as shown in FIG. 3, light emitted toward the upward light emitting surface 122 may be uniformly emitted to a distant region A in the x-axis direction while being deflected in a downward direction, light emitted to the intermediate light emitting surface 125 may be uniformly emitted toward an intermediate region B in the approximate x-axis direction while being deflected in a downward direction, and light emitted to the downward light emitting surface 127 may be uniformly emitted toward a close region C in the x-axis direction while being deflected in a downward direction.

As shown in FIG. 3, when light emitted to the light emitting surface 120 of the LED lens 100 is emitted in the x-axis direction while being deflected in a downward direction, light may be emitted in the approximately downward direction compared with a visual field of a driver of a vehicle, thereby preventing driver's glare.

As shown in FIG. 2, at least one white LED 21 for emitting white light and at least one yellow LED 22 for emitting yellow light may be accommodated in the accommodation groove 110, and the white LEDs 21 and the yellow LEDs 22 may be alternately arranged in the y-axis direction.

That is, the LED lens 100 according to the present disclosure may be disposed on at least two LEDs 20, and the at least two LEDs 20 accommodated in the accommodation groove 110 of the LED lens 100 may include the white LEDs 21 and the yellow LEDs 22 that are alternately arranged.

The LED lighting module 10 according to an embodiment of the present disclosure may be used as a low streetlight, and the accommodation groove 110 of one LED lens 100 may include at least one white LEDs 21 and at least one yellow LEDs 22 accommodated therein in order to emit light only to the white LEDs 21 to emit white light to a road at ordinary times and emit white light only to the yellow LEDs 22 to emit yellow light to the road in an environment condition such as mist, snow, or rain.

In this case, the white LEDs 21 and the yellow LEDs 22 accommodated in one accommodation groove 110 may be alternately arranged in the y-axis direction to equalize light distribution of the LED lighting module 10 in the case in which only the white LEDs 21 emit light and in the case only the yellow LEDs 22 emit light.

Hereinafter, the detailed configuration of the LED lens 100 according to an embodiment of the present disclosure will be described in detail.

Figure 4:
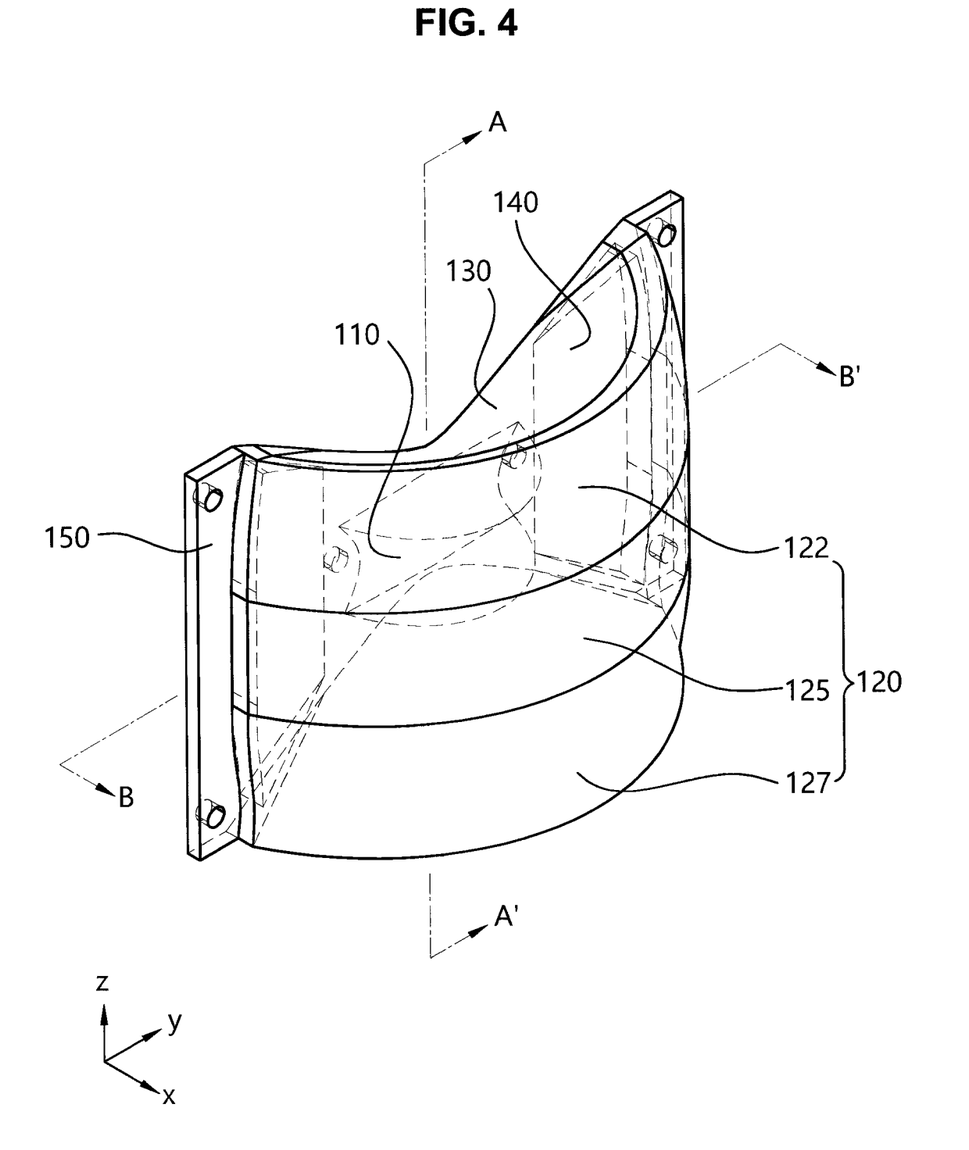
FIG. 4 is a perspective view illustrating an LED lens for a low streetlight according to an embodiment of the present disclosure.
Figure 5:
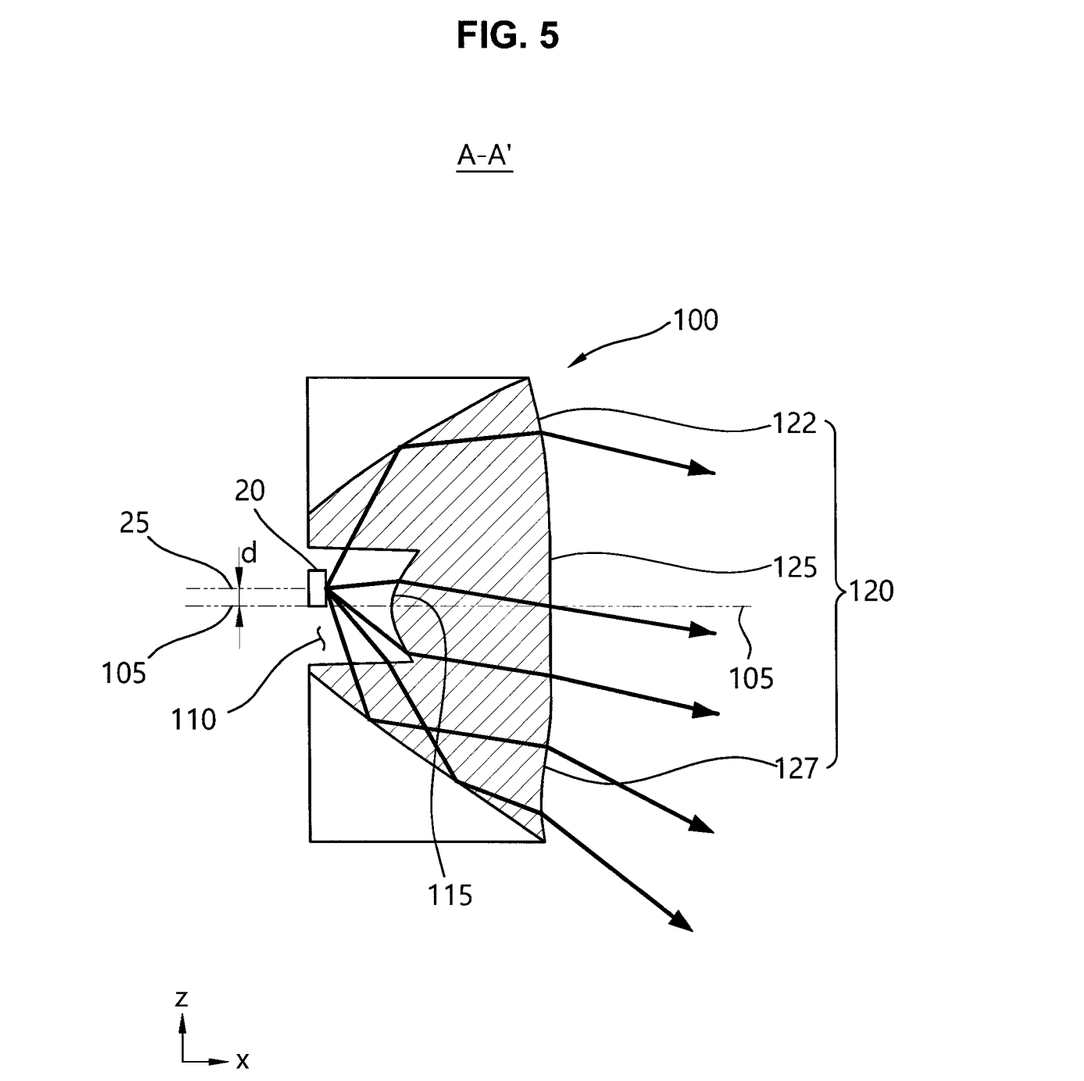
FIG. 5 is an A-A' cross-sectional view taken along the x-z plan of FIG. 4.
Figure 6:
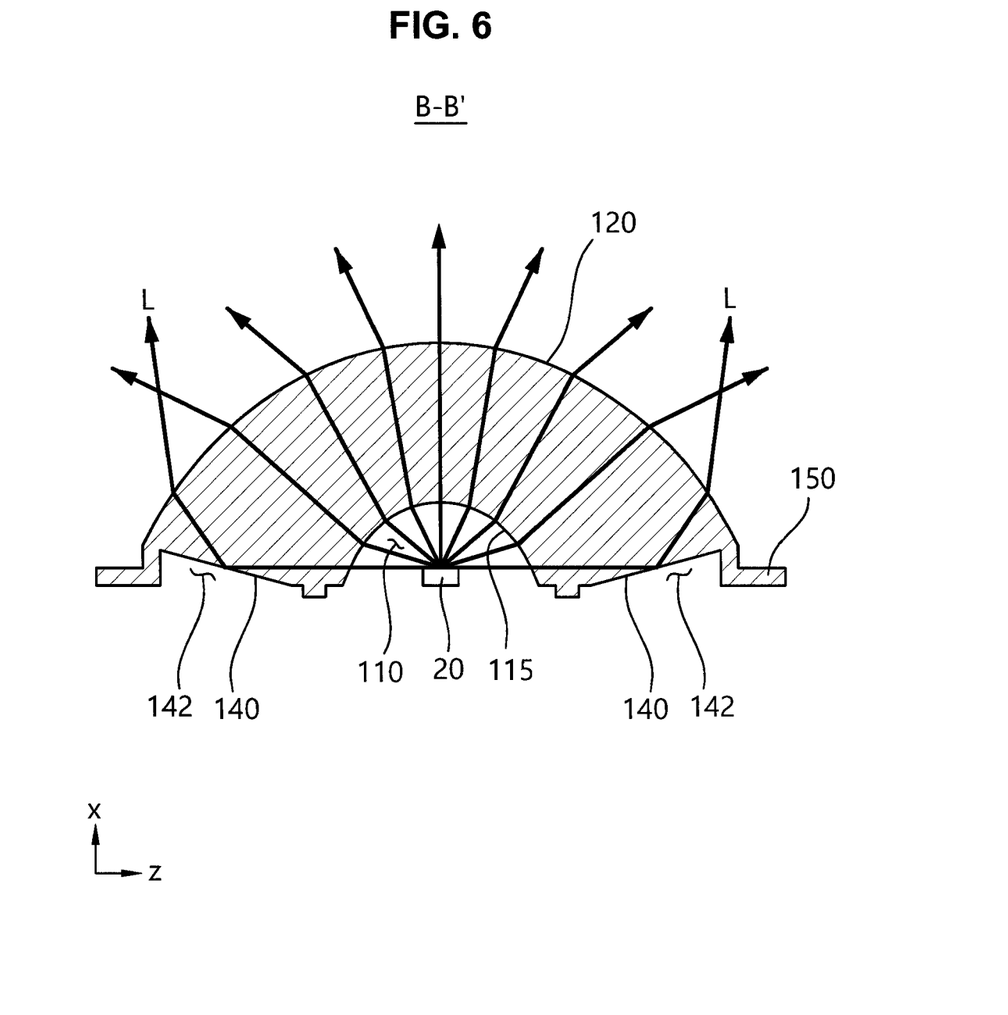
FIG. 6 is a B-B' cross-sectional view taken along the x-y plan of FIG. 4.

FIG. 4 is a perspective view illustrating an LED lens for a low streetlight according to an embodiment of the present disclosure. FIG. 5 is an A-A' cross-sectional view taken along the x-z plan of FIG. 4. FIG. 6 is a B-B' cross-sectional view taken along the x-y plan of FIG. 4.

Here, the x-axis direction that is a lateral direction of a road is a direction toward a central axis 10 of the LED lens 100, the y-axis direction that is a longitudinal direction of the road is a horizontal direction of the LED lens 100, and the z-axis direction that is a height direction of the road is a vertical direction of the LED lens 100.

The LED lens 100 according to an embodiment of the present disclosure may include a bottom surface 102, the accommodation groove 110, the light emitting surface 120, a pair of first reflective surfaces 130, a pair of inclined grooves 142 that form a pair of second reflective surfaces 140, and a flange portion 150 that extends in the y-axis direction.

As shown in FIGS. 2 and 4, the bottom surface 102 may have an approximately square shape based on the y-z plan, and the accommodation groove 110 may be formed in a rectangular shape that extends in the approximate y-axis direction at the central portion of the bottom surface 102 based on the y-z plan and may accommodate the plurality of LEDs 20 that are arranged in the y-axis direction.

The accommodation groove 110 may be convex toward an opposite direction to the LED 20 accommodated in the accommodation groove 110 based on the x-y sectional view taken along the x-y plan (refer to FIGS. 4 and 6), and thus the x-y sectional view of the front surface 115 of the accommodation groove 110 may also be convex toward an opposite direction to the LED 20 accommodated in the accommodation groove 110, and the x-z sectional view taken along the x-z plan of the front surface 115 of the accommodation groove 110 may be convex toward the LED 20 accommodated in the accommodation groove 110 (refer to FIGS. 3 to 5).

As shown in FIG. 5, the LED lens 100 may be disposed on the LED 20, and the central axis 105 of the LED lens 100 may be configured to be deflected by a predetermined distance 'd' in a downward direction compared with the optical axis 25 of the LED 20, as described above.

The light emitting surface 120 may be convex toward an opposite direction to the LED 20 accommodated in the accommodation groove 110 on the x-y sectional view taken along the x-y plan (refer to FIGS. 4 and 6), and may include the upward light emitting surface 122 having (+) curvature, the intermediate light emitting surface 125 having (0) curvature, and the downward light emitting surface 127 having (−) curvature on the x-z sectional view taken along the x-z plan (refer to FIGS. 3 to 5).

Referring to FIGS. 3 to 5, the pair of first reflective surfaces 130 may be formed to be symmetrical with each other at opposite sides in the z-axis direction based on the accommodation groove 110 to configure lateral surfaces in the z-axis direction of the LED lens 100, and may be a component for reflecting light emitted in the z-axis direction of light emitted from the LED accommodated in the accommodation groove 110 toward the light emitting surface 120.

Referring to FIGS. 2, 4, and 6, the pair of inclined grooves 142 may be formed to be symmetrical with each other at opposite sides in the y-axis direction of the bottom surface 102 based on the accommodation groove 110, and may be inclined upward away from the accommodation groove 110 of the bottom surface 102 to form the pair of second reflective surfaces 140.

Thus, as shown in FIG. 6, the pair of second reflective surfaces 140 may reflect light L emitted in the y-axis direction of light emitted from the LED 20 accommodated in the accommodation groove 110 toward the light emitting surface 120, thereby preventing light interference between the LED lens 100 and another LED lens 100, which are arranged adjacent to each other in a line in the y-axis direction.

Figure 7:
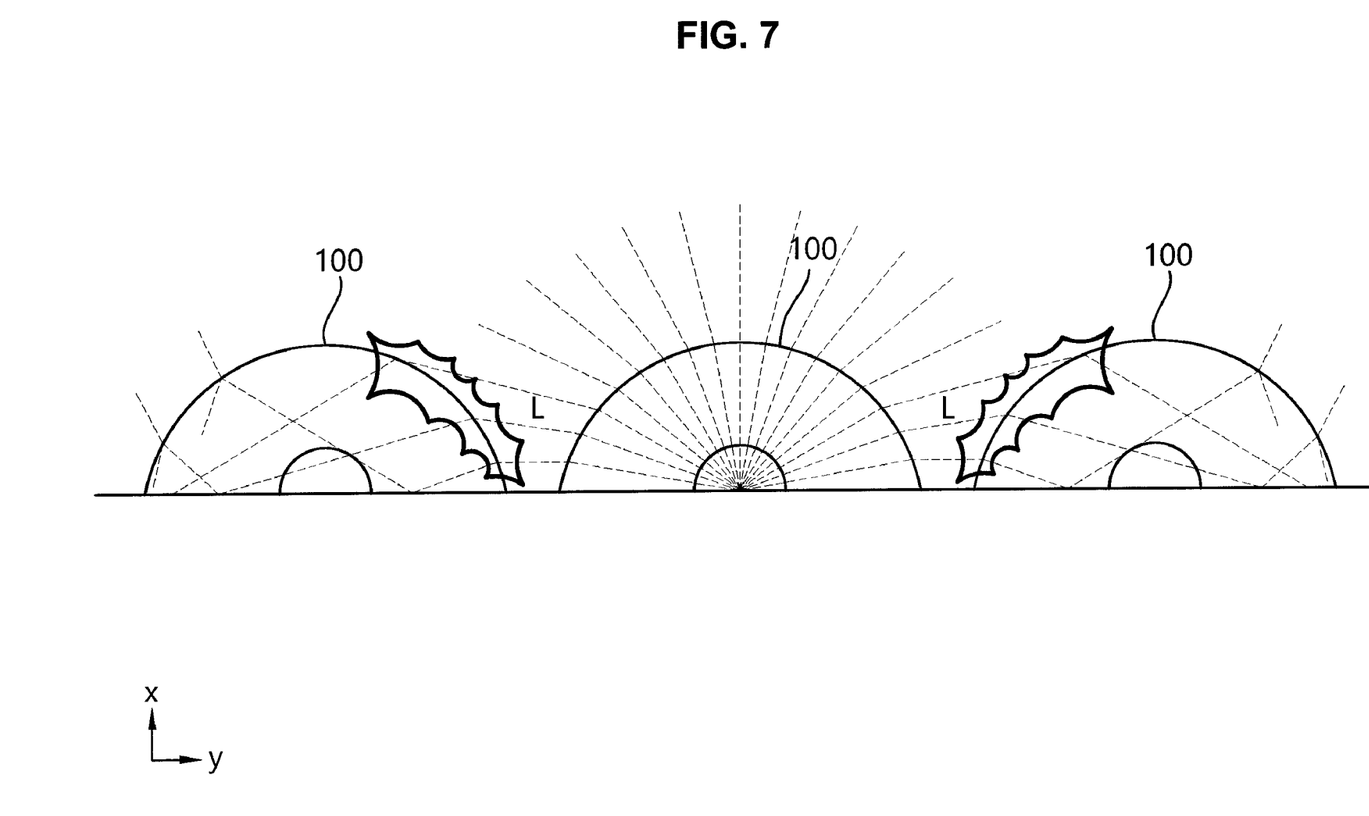
FIG. 7 is a diagram for explaining an effect of a second reflective surface according to an embodiment of the present disclosure.

FIG. 7 is a diagram for explaining an effect of a second reflective surface according to an embodiment of the present disclosure.

As shown in FIG. 7, the LED lenses 100 according to an embodiment of the present disclosure may be arranged in the y-axis direction, and in this case, when the pair of second reflective surfaces 140 are not formed, an interference phenomenon whereby some light L of light emitted in the y-axis direction of light accommodated in the accommodation groove 110 is incident on another LED lens 100 adjacent to the LED lenses 100 may occur, and in this regard, the pair of inclined grooves 142 and the second reflective surfaces 140 may be a component for preventing the above interference phenomenon.

Figure 8:
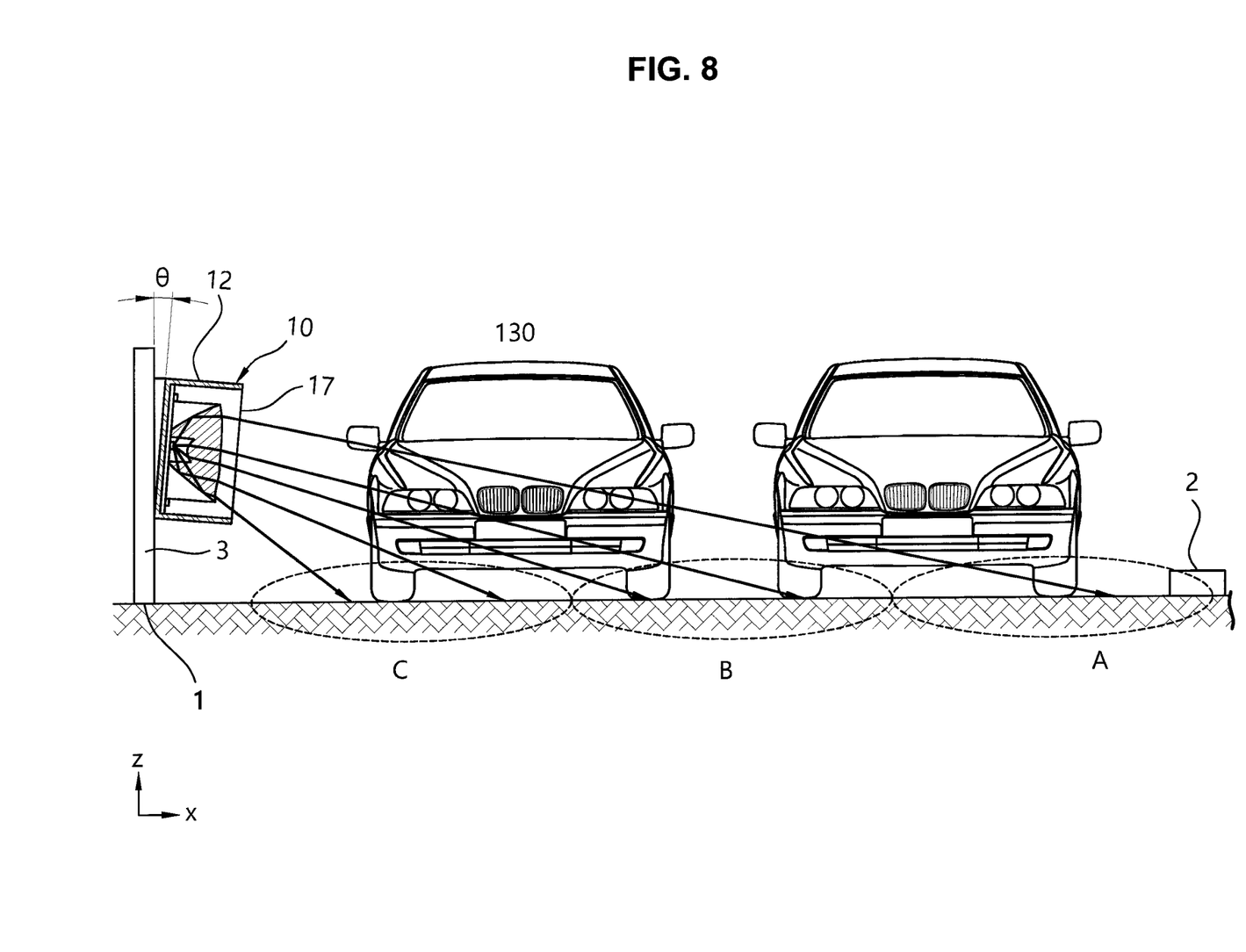
FIG. 8 is a schematic diagram of an LED lighting module for a low streetlight according to another embodiment of the present disclosure.

FIG. 8 is a schematic diagram of an LED lighting module for a low streetlight according to another embodiment of the present disclosure.

As shown in FIG. 8, according to the present embodiment, the optical axis 25 of the LED 20 and the central axis 105 of the LED lens 100 may be inclined at a predetermined angle θ in a downward direction.

However, unlike a conventional streetlight that is installed at a high position and emits light in a downward direction toward a road, the LED lighting module 10 for a low streetlight according to the present disclosure may be installed at a low height corresponding to an approximate height of a vehicle and may emit light in the lateral direction (the x-axis direction) of the road, and the angle θ at which the optical axis 25 and the central axis 105 are inclined may not be greater than about 5 degrees.

That is, the optical axis 25 of the LED 20 of the LED lighting module 10 according to the present disclosure and the central axis 105 of the LED lens 100 may be formed in the approximate x-axis direction to emit light in the lateral direction of the road, but may be formed to be inclined downward in the range of about 5 degrees, and the present disclosure is not limited thereto.

As described above, the present disclosure relates to an LED lighting module for a low streetlight installed at a low position and configured to emit light in a direction across a road, and an LED lens included in the LED lighting module, and when the LED lighting module for the low streetlight according to an embodiment of the present disclosure as configured above are used, the streetlight may be installed at a low position to reduce an installation cost of the streetlight, and may uniformly emit light in a lateral direction of the road while being deflected downward, thereby preventing driver's glare and simultaneously minimizing light loss, and may be embodied in various forms. Thus, it will be understood by those of ordinary skill in the art that various changes in form and details may be made therein without departing from the spirit and scope of the present disclosure as defined by the following claims.

The invention claimed is:

1. A light emitting diode (LED) lighting module for a low streetlight for emitting light in a direction across a road, comprising:
   when a lateral direction across the road is an x-axis direction, a longitudinal direction of the road is a y-axis direction, and a height direction is a z-axis direction,
   a substrate;
   a plurality of LEDs arranged in the y-axis direction on the substrate and installed to have an optical axis in the x-axis direction; and
   an LED lens configured to have a central axis in the x-axis direction on the LED and including an accommodation groove configured to accommodate the plurality of LEDs, and a light emitting surface configured to emit light that is emitted from the LEDs accommodated in the accommodation groove, the light being and is incident into the LED lens,
   wherein the central axis of the LED lens is configured to be deflected by a predetermined distance in a downward direction compared with the optical axis of the LEDs to deflect and emit light emitted from the LEDs accommodated in the accommodation groove in a downward direction, and the front surface of the accommodation groove has a convex shape toward the LEDs accommodated in the accommodation groove based on an x-z sectional view,
   wherein the light emitting surface is convex toward an opposite direction to the LED accommodated in the accommodation groove based on an x-y sectional view and includes an upward light emitting surface, an intermediate light emitting surface, and a downward light emitting surface based on the x-z sectional view, and the upward light emitting surface has (+) curvature, the intermediate light emitting surface has (0) curvature, and the downward light emitting surface has (−) curvature.

2. The LED lighting module of claim 1, wherein the accommodation groove is formed at a central portion of a bottom surface of the LED lens, and the LED lens has a pair of first reflective surfaces that are symmetrical with each other at opposite sides in the z-axis direction based on the accommodation groove to configure lateral surfaces in the z-axis direction of the LED lens and reflects light emitted in the z-axis direction of light emitted from the LEDs accommodated in the accommodation groove toward the light emitting surface.

3. The LED lighting module of claim 2, wherein the LED lens includes a pair of inclined grooves that are formed to be symmetrical with each other at opposite sides in the y-axis direction of the bottom surface based on the accommodation groove, and the pair of inclined grooves form a pair of second reflective surfaces that reflect light emitted in the y-axis direction of light emitted from the LEDs accommodated in the accommodation groove toward the light emitting surface and prevents light from interfering with another LED lens adjacent to the LED lens.

4. The LED lighting module of claim 3, wherein the accommodation groove accommodates at least one white LED for emitting white light and at least one yellow LED for emitting yellow light, and the white LED and the yellow LED are alternately arranged in the y-axis direction.

5. The LED lighting module of claim 1, wherein the optical axis of the LEDs and the central axis of the LED lens are inclined at a predetermined angle in a downward direction.

* * * * *